PETER SPENCE, OF NEWTON HEATH, MANCHESTER, ENGLAND.

Letters Patent No. 83,417, aated October 27, 1868.

IMPROVEMENT IN PURIFYING ILLUMINATING-GAS.

The Schedule referred to in these Letters Patent and making part of the same.

*To all whom it may concern:*

Be it known that I, PETER SPENCE, of Newton Heath, Manchester, in the county of Lancaster, England, have invented a new and useful Improvement in the Mode of Purifying Illuminating-Gas, for which I have received Letters Patent from the English Government, No. 1,361, and dated April 25, 1868; and I do hereby declare that the following is a full, clear, and exact description thereof.

My invention relates to the application of a certain material or materials for purifying gas, whereby it is deprived of sulphuretted hydrogen. For this purpose I employ protosilicates and protocarbonates of iron, in a native state, or as they arise from manufacturing processes. The substance I especially use is the "slag" which arises from regulus during the process of smelting copper ores, and which is the silicate of iron required. The slag, also, which arises from the puddling of iron, and commonly called "tap-cinder," is a similar substance, and will answer the purpose of my invention.

The photocarbonates I use may be defined by the "Cleveland and black-band iron-stone."

In conducting my process, I grind the material into small particles, and diffuse it in the purifier ordinarily used in the manufacture of gas for illumination.

In purifying gas from sulphur, I grind the copper slag to a suitable fineness, say till it passes through a sieve of eighty (80) holes to the inch lineal; but the iron slag or tap-cinder and the natural photocarbonates of iron are sufficiently ground if they pass through a sieve of twenty (20) holes to the inch lineal. I use them on the usual form of purifiers, (first damping them with water,) and after being used until they take up no more sulphur, they are removed from the purifiers, and spread upon the ground, and damped with water, then turned over once or twice. and in a few hours they change color, and are again ready for the purifiers, and may be so used from fifty to a hundred times, or until they become charged with sulphur to from sixty-five to seventy-five per cent. They will then be worth from twenty (20) to twenty-five (25) dollars per ton for the manufacture of sulphuric acid. I use fifty (50) tons per week of them for this purpose.

In addition to the purposes above specified, two most valuable applications of it may be made. The iron or copper slag is ground, and. for the new purpose it is quite sufficient that they each be passed through a sieve of twenty (20) holes to the inch lineal, (four hundred to the square inch.) A given weight of sulphuric acid is taken, of the specific gravity of 1.6, (or 120° Twaddle's hydrometer.) Into this acid (cold) is stirred an equal weight of the ground slag. Heat is evolved, and the mixture is allowed to stand for, say, twenty-four (24) or thirty (30) hours, when it will be found a perfectly dry cake or powder. This I should call "dry copperas," and it may be used for two among other purposes: First, it may be converted into the copperas of commerce by merely dissolving in hot water, and crystallizing from the clear solution; or the dry powder may be sent to the gas-works to purify the gas from ammonia, as is now done, by copperas and sawdust, but no sawdust is required for this powder, and when returned from the gas-works it will contain over half its weight of sulphate of ammonia, and will be worth thirty (30) to forty (40) dollars per ton as an agricultural fertilizer or other uses.

Having thus fully described my invention,

What I claim as new, and desire to secure by Letters Patent, is—

The use of protosilicates and protocarbonates of iron, specially the slags before mentioned, for purifying gas, for lighting, from sulphuretted hydrogen, and also the use of these substances, as specified, for the product of "dry copperas," or the copperas of commerce, and the use of said "dry copperas" for purifying gas from ammonia.

PETER SPENCE.

Witnesses:
WM. TUDOR MABLEY, *Manchester.*
W. T. CHEETHAM, *Manchester.*